US010702088B2

(12) United States Patent
Delrue et al.

(10) Patent No.: US 10,702,088 B2
(45) Date of Patent: Jul. 7, 2020

(54) STEAMER ACCESSORY FOR STEAM-HEATING AND/OR STEAMING FOOD IN A CONTAINER

(71) Applicant: SEB S.A., Ecully (FR)

(72) Inventors: Olivier Delrue, Selongey (FR); Laurent Guegan, Lornay (FR); Pierre Sartout, St Apollinaire (FR); Guillaume Prieto, Marsannay le Bois (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 16/305,647

(22) PCT Filed: May 29, 2017

(86) PCT No.: PCT/FR2017/051334
§ 371 (c)(1),
(2) Date: Nov. 29, 2018

(87) PCT Pub. No.: WO2017/207907
PCT Pub. Date: Dec. 7, 2017

(65) Prior Publication Data
US 2019/0335934 A1    Nov. 7, 2019

(30) Foreign Application Priority Data

May 31, 2016    (FR) .................................... 16 54920

(51) Int. Cl.
*A47J 27/04*    (2006.01)
*A47J 27/00*    (2006.01)
(Continued)

(52) U.S. Cl.
CPC ............. *A47J 27/04* (2013.01); *A47J 27/002* (2013.01); *A47J 36/06* (2013.01); *A47J 36/2405* (2013.01); *A47J 2027/043* (2013.01)

(58) Field of Classification Search
CPC ......... A47J 27/04; A47J 27/002; A47J 36/06; A47J 36/2405; A47J 2027/043
(Continued)

(56) References Cited

U.S. PATENT DOCUMENTS

| 6,530,308 B1* | 3/2003 | Lin | .......................... A47J 27/04 |
| | | | 219/386 |
| 2003/0084790 A1* | 5/2003 | Rossi | ...................... A47J 27/04 |
| | | | 99/330 |
| 2014/0103023 A1 | 4/2014 | Kao | |

FOREIGN PATENT DOCUMENTS

| FR | 2 786 083 A1 | 5/2000 |
| GB | 2 391 163 A | 2/2004 |
| JP | 52045785 | * 3/1997 |

OTHER PUBLICATIONS

International Search Report as issued in International Patent Application No. PCT/FR2017/051334, dated Oct. 5, 2017.
(Continued)

*Primary Examiner* — Dana Ross
*Assistant Examiner* — Joseph W Iskra
(74) *Attorney, Agent, or Firm* — Pillsbury Winthrop Shaw Pittman LLP

(57) ABSTRACT

A steamer accessory includes a water reservoir communicating with the outside via a filling orifice, and a steam generator including a steam production chamber connected to at least one steam distribution outlet provided in a lower part of the steam generator, the water reservoir communicating with the steam production chamber via a water supply inlet. The steam production chamber communicates with at least one steam evacuation outlet disposed higher up than the water supply inlet, the steam production chamber being confined above the steam evacuation outlet(s), the or each
(Continued)

Figure 1:
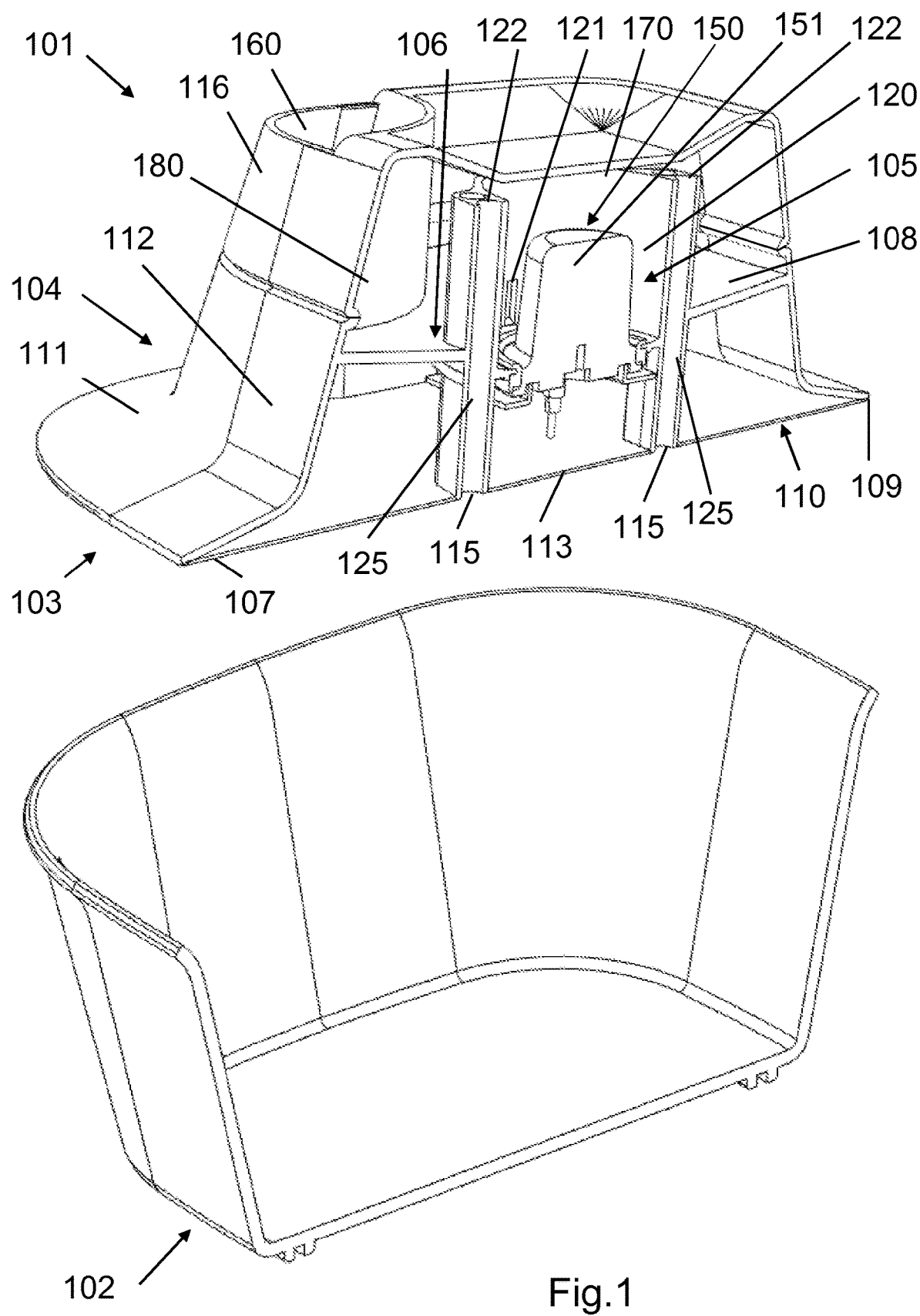

steam evacuation outlet communicating via a duct with the or one of the steam distribution outlet(s).

14 Claims, 2 Drawing Sheets

(51) Int. Cl.
  *A47J 36/06* (2006.01)
  *A47J 36/24* (2006.01)
(58) Field of Classification Search
  USPC .......................................... 99/330, 403, 417
  See application file for complete search history.

(56) References Cited

OTHER PUBLICATIONS

International Preliminary Report on Patentability and the Written Opinion of the International Searching Authority as issued in International Patent Application No. PCT/FR2017/051334, dated Dec. 4, 2018.

* cited by examiner

STEAMER ACCESSORY FOR STEAM-HEATING AND/OR STEAMING FOOD IN A CONTAINER

CROSS-REFERENCE TO RELATED APPLICATIONS

This application is the U.S. National Stage of International Application Serial No. PCT/FR2017/051334, filed May 29, 2017, which in turn claims priority to French Application No. 1654920, filed May 31, 2016. The contents of all of these applications are incorporated herein by reference in their entirety.

This invention concerns the technical field of steam production appliances and devices for steam heating and/or steaming foods.

More specifically, this invention concerns steamer accessories for steam heating and/or steaming foods in a container.

This invention also concerns appliances for steam heating and/or steaming foods, comprising a container associated with a steam production device forming such a steamer accessory.

From document US 2014/0103023, we know of an appliance comprising a steam production accessory used for steam heating and/or steaming foods in a container. This steam production accessory comprises a steam generator comprising a steam production chamber and a water reservoir supplying water to the steam production chamber. The steam production chamber is connected to steam distribution outlets provided in a lower part of the steam generator above the container.

One drawback of this appliance is that it is necessary to use caution when filling the water reservoir of the steam generator because of the presence of the steam generator.

One objective of this invention is to propose a steamer accessory used with a container for steam heating and/or steaming foods, and in which the filling of the water reservoir is facilitated.

Another objective of this invention is to propose a steamer accessory used with a container for steam heating and/or steaming foods, and which is economical to construct.

Another objective of this invention is to propose a steamer accessory used with a container for steam heating and/or steaming foods, and which offers good steam production performance.

Another objective of this invention is to propose an electric steamer for steam heating and/or steaming foods which comprises a container and a steamer accessory, and in which the filling of the water reservoir is facilitated.

Another objective of this invention is to propose an electric steamer for steam heating and/or steaming foods which comprises a container and a steamer accessory, and which is economical to construct.

Another objective of this invention is to propose an electric steamer for steam heating and/or steaming foods which comprises a container and a steamer accessory, and which offers good steam production performance.

These objectives are achieved with a steamer accessory for steam-heating and/or steaming foods in a container, the steamer accessory comprising a water reservoir communicating with the outside via a filling orifice, the steamer accessory comprising a steam generator comprising a steam production chamber connected to at least one steam distribution outlet provided in a lower part of the steam generator, the water reservoir communicating with the steam production chamber via a water supply inlet, because the steam production chamber communicates with at least one steam evacuation outlet positioned higher up than the water supply inlet, and because the steam production chamber is confined above the steam evacuation outlet(s), and because the or each steam evacuation outlet communicates via a duct with the or one of the steam distribution outlet(s). In this way, the water poured into the water reservoir may freely reach the steam production chamber; the water reaching the steam production chamber is transformed into steam; the steam rises to reach the steam evacuation outlet(s), then crosses the duct(s) to reach the steam distribution outlet(s). In this way, it is possible to obtain a steam generator of a particularly economical design. This steam generator presents good steam production performance. The filling of the water reservoir is facilitated.

Advantageously then, the steam production chamber communicates with the steam evacuation outlet(s) through a steam expansion chamber positioned above the steam production chamber. This arrangement facilitates the travel of the steam.

Advantageously then, a separating side wall is arranged between the filling orifice and the steam expansion chamber, and the separating side wall extends lower than the steam evacuation outlet(s). This arrangement simplifies the construction of the steamer.

Advantageously then, the separating side wall extends lower than the water supply inlet. This arrangement allows better confinement of the steam.

According to one embodiment, the separating side wall extends into the water reservoir. This arrangement simplifies the construction of the steamer.

Advantageously again, the water reservoir has a bottom discharging towards the water supply inlet. This arrangement allows better use of the volume of the water reservoir.

Advantageously again, the steam production chamber comprises a heating device. If desired, the steam production chamber can comprise several heating devices.

According to an advantageous embodiment, the heating device comprises a heating pad. This arrangement makes it possible to obtain an efficient and particularly economical construction.

Advantageously again, the steam generator has an external side wall and the steam production chamber is arranged in the steam generator at a distance from the external side wall. These arrangements permit limiting the temperature of the external side wall of the steam generator.

Advantageously again, the water reservoir surrounds the steam production chamber. This arrangement avoids the presence of hot external side walls.

Advantageously again, the steam generator has a lower wall in which the steam distribution outlet(s) is/are formed, and the steam production chamber is arranged inside the steam generator at a distance from the lower wall. This arrangement makes it easier to house the electrical components.

Advantageously again, the steam generator has an annular lower bearing surface. This arrangement permits placing the steam generator on the top edge of a container.

Advantageously again, the steam generator has at least one vent bringing the lower part of the steam generator into communication with an external part of the steam generator extending above the lower part. This arrangement permits better control of the escape of steam from the container closed by the steam generator. Alternatively or in addition, at least one passage may be provided between the container and the steam generator, to facilitate the escape of steam from the container.

Advantageously then, the said at least one vent is surrounded by the annular lower bearing surface. This arrangement permits balancing the pressure inside the container closed by the steam generator, while controlling the escape of steam from the container closed by the steam generator.

Advantageously then, the said at least one vent discharges in the external side wall.

These objectives are also achieved with an electric steamer comprising a container to contain the foods to be steam heated and/or steamed, and a lid with a lower face to be positioned on the container, because the lid comprises a steamer accessory according to at least one of the aforementioned characteristics.

Figures 2, 3:
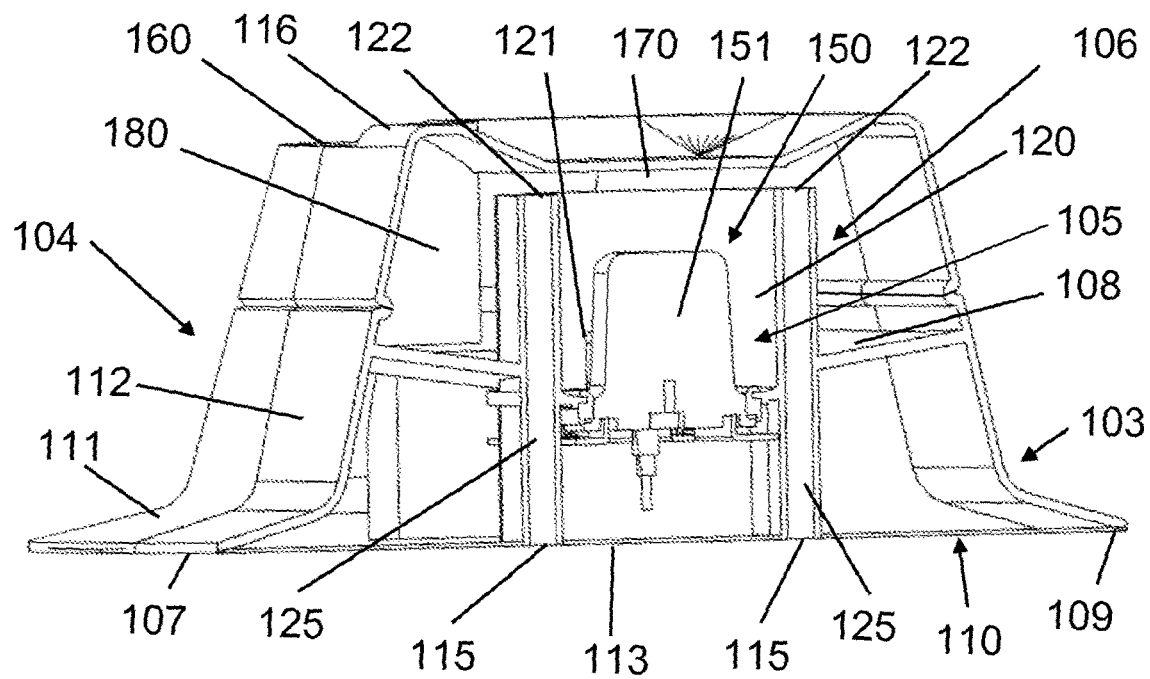

The invention will be more fully understood by examining an embodiment example, which is in no way restrictive, illustrated in the attached FIGS. 1 to 3, in which:

FIG. 1 is an exploded perspective cross-sectional view of an embodiment example of an electric steamer comprising a steamer accessory according to the invention, FIG. 2 is a perspective cross-sectional view of the steamer accessory illustrated in FIG. 1, according to another orientation, FIG. 3 is a perspective cross-sectional view of the steamer accessory illustrated in FIGS. 1 and 2, according to another cross section.

The electric steamer 101 illustrated schematically in FIG. 1 is an appliance for steam heating and/or steaming foods, comprising a container 102 to contain the foods to be steam heated and/or steamed, and a lid 103 provided to rest on the container 102. For this purpose, the lid 103 has a lower face 107 provided to be positioned on the container 102.

The lid 103 comprises a steamer accessory 104 for steam heating and/or steaming foods in the container 102.

More specifically, in the embodiment example illustrated in FIGS. 1 to 3, the lid 103 forms a steamer accessory 104 for steam heating and/or steaming foods in the container 102. As a variant, the lid 103 may in particular comprise a support device, if desired a removable one, provided to hold the steamer accessory 104, and to rest on the container 102.

The steamer accessory 104 comprises a steam generator 105 and a water reservoir 106. The water reservoir 106 communicates with the outside via a filling orifice 160. If desired, the water reservoir 106 may have at least one other filling orifice.

The steam generator 105 comprises a steam production chamber 120. The water reservoir 106 supplies water to the steam production chamber 120 by gravity. For this purpose, the water reservoir 106 communicates via a water supply inlet 121 with the steam production chamber 120. If desired, the water reservoir 106 may communicate with the steam production chamber 120 through at least one other water supply inlet.

Preferably, the water reservoir 106 has a bottom 108 discharging towards the water supply inlet 121.

In the embodiment example illustrated in FIGS. 1 to 3, the water reservoir 106 surrounds the steam production chamber 120. For this purpose, an annular wall 124, better visible on FIG. 3, surrounds the steam production chamber 120. The water supply inlet 121 is formed in the annular wall 124.

The steam production chamber 120 comprises a heating device 150 to transform the water in the steam production chamber 120 into steam. In the embodiment example illustrated in FIGS. 1 to 3, the heating device 150 comprises a heating pad 151. As a variant, the heating device 150 may in particular comprise a heating element arranged under a heat diffusion plate and/or in a heat diffusion plate forming at least a part of the bottom of the steam production chamber 120.

The steam production chamber 120 is connected to at least one steam distribution outlet 115 provided in a lower part 110 of the steam generator 105. For this purpose, the steam production chamber 120 communicates with at least one steam evacuation outlet 122 positioned higher up than the water supply inlet 121. The steam production chamber 120 is confined above the steam evacuation outlet(s) 122. The or each steam evacuation outlet 122 communicates via a duct 125 with the or one of the steam distribution outlet(s) 115.

More specifically, in the embodiment example illustrated in FIGS. 1 to 3, the steam production chamber 120 communicates with the steam evacuation outlet(s) 122 via a steam expansion chamber 170 positioned above the steam production chamber 120. In other words, the said steam expansion chamber has no communication with the outside above the said at least one steam evacuation outlet 122. A separating side wall 180 is arranged between the filling orifice 160 and the steam expansion chamber 170 in order to prevent the escape of steam from the filling orifice 160. For this purpose, the separating side wall 180 extends lower than the steam evacuation outlet(s) 122. In other words, the separating side wall 180 extends below the steam evacuation outlet(s) 122. More specifically, the separating side wall 180 extends lower than the water supply inlet 121. As is clearly visible in FIGS. 1 to 3, the separating side wall 180 extends into the water reservoir 106. In other words, the water may reach the two faces of the lower part of the separating side wall 180.

In the embodiment example illustrated in FIGS. 1 to 3, the steam production chamber 120 has several steam evacuation outlets 122 positioned higher up than the water supply inlet 121 and communicating via several ducts 125 with the steam distribution outlets 115. More specifically, the ducts 125 are provided in the annular wall 124. Two groups of three ducts 125 are positioned on both sides of the heating pad 151. The ducts 125 are vertical. As a variant, the ducts 125 may be descending without necessarily being vertical. Preferably, the ducts 125 do not have baffles. In other words, the ducts 125 are descending in a continuous manner, without necessarily being straight.

More specifically, the steam generator 105 has an annular lower bearing surface 109 provided to rest on the container 102.

The steam generator 105 has a lower wall 113 in which is/are formed the steam distribution outlet(s) 115. The steam production chamber 120 is arranged in the steam generator 105 at a distance from the lower wall 113, which permits more freedom in the position of the steam distribution outlets 115.

The steam generator 105 has at least one vent 118 bringing the lower part 110 of the steam generator 105 into communication with an external part 111 of the steam generator 105 extending above the lower part 110. The said at least one vent 118 is surrounded by the annular lower bearing surface 109.

The steam generator 105 has an external side wall 112. The bottom 108 of the water reservoir 106 connects the external side wall 112 to the annular wall 124. The steam production chamber 120 is arranged in the steam generator 105 at a distance from the external side wall 112. The said at least one vent 118 discharges in the external side wall 112.

In the embodiment example illustrated in FIGS. 1 to 3, the steam generator 105 has several vents 118 bringing the lower part 110 of the steam generator 105 into communication with the external part 111 of the steam generator 105. The lower part 110 forms the lower wall 113. The external part 111 forms the external side wall 112. Two groups of three vents 118 are positioned on both sides of the water reservoir 106 surrounding the steam production chamber 120.

The steamer accessory 104 has a top wall 116 advantageously made of transparent or translucent material. The top wall 116 is assembled with the external side wall 112, for example by clipping, bonding, overmoulding, screwing or welding. The top wall 116 forms a part of the water reservoir 106. The separating side wall 180 comes out of the top wall 116. The top wall 116 forms the upper part of the steam expansion chamber 170.

The electric steamer 101 illustrated in FIG. 1 and the steamer accessory 104 illustrated in FIGS. 1 to 3 operate and are used as follows.

The user places the steamer accessory 104 on the container 102 after having placed the foods in the container 102. The user fills the water reservoir 106 through the filling orifice 160. The water flows through the water supply inlet 121 into the steam production chamber 120. Preferably, the user fills the water reservoir 106 up to a level sufficiently lower than the steam evacuation outlets 122 to prevent the water from reaching the steam evacuation outlets 122 and flowing through the ducts 125. The user then turns on the heating device 150. The temperature of the water in the steam production chamber 120 rises until steam is produced. The steam rises from the steam production chamber 120 to reach the steam expansion chamber 170. The steam is then confined by the top wall 116, by the separating side wall 180 and by the water in the water reservoir 106. The steam then escapes via the steam evacuation outlets 122 to reach the steam distribution outlets 115 by descending through the ducts 125. The steam exiting the steam distribution outlets 115 spreads through the container 102. The air above the foods can escape through the vents 118. When the foods are saturated with steam, the steam also escapes through the vents 118.

If desired, the steam production chamber 120 can comprise several heating devices.

As a variant, the steam generator 105 does not necessarily comprise at least one vent 118. Alternatively or in addition, at least one passage may be provided between the lid 103 and the container 102, for example between the steam generator 105 and the container 102, to allow the steam to escape from the container 102.

If desired, the steam generator 105 may comprise a support device that can be removed from the steam production chamber 120, such that the steam production chamber 120 rests on the said support device and the said support device has at least a portion of bearing surface provided to rest on a container. The support device may in particular have an annular configuration or a U-shaped configuration. Alternatively, the removable support device may in particular belong to the lid 103.

This invention is in no way limited to the embodiment example described and its variants, but encompasses many modifications in the context of the claims.

The invention claimed is:

1. A steamer accessory for steam-heating and/or steaming foods in a container, the steamer accessory comprising:
   a water reservoir communicating with the outside via a filling orifice;
   a steam generator comprising a steam production chamber connected to at least one steam distribution outlet provided in a lower part of the steam generator, the water reservoir communicating with the steam production chamber via a water supply inlet, wherein the steam production chamber communicates with at least one steam evacuation outlet positioned higher up than the water supply inlet, wherein the steam production chamber communicates with the at least one steam evacuation outlet via a steam expansion chamber positioned above the steam production chamber so that steam rising from the production chamber to the steam expansion chamber is confined above the at least one steam evacuation outlet, and wherein the at least one or each steam evacuation outlet communicates via a duct with the at least one steam distribution outlet provided in the lower part so that steam produced in the steam production chamber and rising to the steam expansion chamber escapes via the at least one or each steam evacuation outlet to reach the at least one steam distribution outlet by descending through said duct.

2. The steamer accessory according to claim 1, wherein a separating side wall is arranged between the filling orifice and the steam expansion chamber, and wherein the separating side wall extends lower than the at least one steam evacuation outlet.

3. The steamer accessory according to claim 2, wherein the separating side wall extends lower than the water supply inlet.

4. The steamer accessory according to claim 2, wherein the separating side wall extends into the water reservoir.

5. The steamer accessory according to claim 1, wherein the water reservoir has a bottom discharging towards the water supply inlet.

6. The steamer accessory according to claim 1, wherein the steam production chamber comprises a heating device.

7. The steamer accessory according to claim 6, wherein the heating device comprises a heating pad.

8. The steamer accessory according to claim 1, wherein the steam generator has an external side wall and wherein the steam production chamber is arranged in the steam generator at a distance from the external side wall.

9. The steamer accessory according to claim 1, wherein the water reservoir surrounds the steam production chamber.

10. The steamer accessory according to claim 1, wherein the steam generator has a lower wall in which the at least one steam distribution outlet is formed and wherein the steam production chamber is arranged in the steam generator at a distance from the lower wall.

11. The steamer accessory according to claim 1, wherein the steam generator has an annular lower bearing surface.

12. The steamer accessory according to claim 1, wherein the steam generator has at least one vent bringing the lower part of the steam generator into communication with an external part of the steam generator extending above the lower part.

13. The steamer accessory according to claim 12, wherein the steam generator has an annular lower bearing surface, and wherein the at least one vent is surrounded by the annular lower bearing surface.

14. An electric steamer, comprising a container to contain the foods to be heated and/or steamed, and a lid with a lower face provided to be positioned on the container, wherein the lid comprises a steamer accessory for steam-heating and/or steaming the foods in the container, the steamer accessory comprising:
   a water reservoir communicating with the outside via a filling orifice;

a steam generator comprising a steam production chamber connected to at least one steam distribution outlet provided in a lower part of the steam generator, the water reservoir communicating with the steam production chamber via a water supply inlet, wherein the steam production chamber communicates with at least one steam evacuation outlet positioned higher up than the water supply inlet, wherein the steam production chamber communicates with the at least one steam evacuation outlet via a steam expansion chamber positioned above the steam production chamber so that steam rising from the production chamber to the steam expansion chamber is confined above the at least one steam evacuation outlet, and wherein the at least one or each steam evacuation outlet communicates via a duct with the at least one steam distribution outlet provided in the lower part so that steam produced in the steam production chamber and rising to the steam expansion chamber escapes via the at least one or each steam evacuation outlet to reach the at least one steam distribution outlet by descending through said duct.

\* \* \* \* \*